United States Patent [19]

Idel et al.

[11] 4,030,929

[45] June 21, 1977

[54] PHOTOGRAPHIC SILVER HALIDE EMULSION

[75] Inventors: Karsten-Josef Idel, Krefeld; Wilhelm Saleck, Schildgen; Erich Wolff, Leverkusen; Dieter Freitag, Krefeld, all of Germany

[73] Assignee: AGFA-Gevaert, A.G., Leverkusen, Germany

[22] Filed: Sept. 14, 1976

[21] Appl. No.: 723,084

[30] Foreign Application Priority Data

Sept. 19, 1975 Germany .................. 2541754

[52] U.S. Cl. .................................. 96/114
[51] Int. Cl.² ............................. G03C 1/72
[58] Field of Search ........................ 96/114

[56] References Cited

UNITED STATES PATENTS

| | | | |
|---|---|---|---|
| 3,709,690 | 1/1973 | Cohen et al. | 96/114 |
| 3,713,834 | 1/1973 | Fitzgerald et al. | 96/114 |
| 3,829,369 | 8/1974 | Feinberg | 96/114 |
| 3,847,620 | 11/1974 | Iguchi et al. | 96/114 |
| 3,852,073 | 12/1974 | Fitzgerald et al. | 96/114 |
| 3,868,252 | 2/1975 | Campbell et al. | 96/114 |

*Primary Examiner*—Jack P. Brammer
*Attorney, Agent, or Firm*—Connolly and Hutz

[57] ABSTRACT

The sensitivity of silver halide emulsions is increased if the silver halide is precipitated in the presence of a peptization agent which consists partially or wholly of a copolymer comprising 0.1 to 20 mol% of recurring structural units of the formula

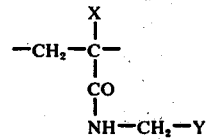

in which X is hydrogen or alkyl having 1 to 4 carbon atoms and Y is a 8-hydroxyquinoline group attached through its 5- or 7-position.

5 Claims, No Drawings

PHOTOGRAPHIC SILVER HALIDE EMULSION

This invention relates to a photographic silver halide emulsion with increased sensitivity, containing novel polymers as sensitivity increasing additives.

The sensitivity to light of a photographic silver halide emulsion can be influenced in two ways. Firstly, the sensitivity can be increased by suitable choice of the physical conditions under which precipitation and so-called physical ripening of the silver halide take place. In practice, however, the effect which can be obtained by this method is limited by the fact that any increase in sensitivity is accompanied by an increase in the silver halide grain whereby the quality of the image finally obtained is adversely affected. It would therefore be desirable to obtain silver halide emulsions with a very high sensitivity but fine grain.

Secondly, the sensitivity of the photographic emulsions can be enhanced by chemical methods, using chemical compounds which are generally known as chemical sensitizers.

In principle, such compounds may be added at any stage of preparation of the emulsion; for example, they may be added as ripening additives before chemical ripening is carried out or they may be added to the finished casting solution after chemical ripening. Compounds which may be used as ripening additives include, for example, noble metal salts, particularly gold salts, and sulphur compounds such as thiosulphates or organic, particularly heterocyclic, sulphur compounds. One disadvantage of chemical sensitization is that the increase in sensitivity achieved is accompanied by an increased tendency of the emulsion to form a uniform developable fog. For this reason, highly effective chemical sensitizers such as compounds having an onium structure, e.g. quaternary ammonium or phosphonium salts or ternary sulphonium salts as well as polyalkylene oxides and polyalkylene oxide derivatives may only be added to the finished casting solution after chemical ripening. If the substances were added before chemical ripening, the photographic silver halide emulsions would be so heavily fogged that they would be practically useless.

It is also possible to add sensitivity increasing additives already at the stage of precipitation of the silver halide or to carry out the precipitation in the presence of such additives. Most chemical sensitizers are unsuitable for this method for the reasons given above. They either do not sensitize sufficiently or cause too much fogging.

Precipitation of the silver halide is generally carried out using gelatine, which has proved to be a particularly suitable binder (peptisation agent) for this purpose because of its good dispersing and protective colloid properties. Gelatine has the added advantage of acting as halogen acceptor in the photographic process and it has excellent gel forming properties as well as other advantageous properties which have made it the preferred binder for photographic silver halide emulsions.

However, it is difficult to prepare gelatine of consistent quality and with constant physical and photographic properties. Most of these properties are deleteriously affected by bacterial decomposition in storage or by hydrolysis during processing. Moreoer, since gelatine is a naturally occurring material, it contains various impurities in varying amounts according to its origin and, while some of these may have an advantageous effect, others may be deleterious. It is also subject to dimensional changes when exposed to variations in temperature and moisture.

Since the photographic properties of the silver halide emulsion depend to a large extent on the precipitation conditions employed, there have been many attempts to replace gelatine by other suitable peptisation agents and in particular by semisynthetic or fully synthetic substances such as synthetic polymers. However, no substantial improvements have thereby been obtained, for example phthalated gelatine as described in U.S. Pat. No. 2,614,928 has disadvantages similar to those of gelatine itself. Although polyvinyl pyrrolidone and polyvinyl alcohol are suitable as protective colloids, they considerably inhibit the growth of silver halide grains. Copolymers of acrylamide and its derivatives have also been proposed as peptisation agents, in U.S. Pat. No. 2,811,494, but it is difficult to prepare synthetic materials which not only have a protective colloid action similar to that of gelatine but are also stable to the pH changes which inevitably occur during preparation of the emulsion and are compatible with gelatine. Although most synthetic polymers which have been described have a positive influence on certain mechanical properties such as dimensional stability and swelling, these advantages are generally achieved at the expense of the ratio of sensitivity to grain size of the photographic materials. Moreover, the monomers required for some of the polymers which have been proposed can only be obtained by complicated, multistage processes.

It is an object of this invention to provide a binder for photographic silver halide emulsions which is suitable as peptisation agent and therefore capable of partly or completely replacing gelatine during the precipitation stage. The novel binder is intended to increase the sensitivity of the photographic silver halide emulsions without substantially increasing the grain size. It should also improve the capacity for partial development of the emulsion and the covering power of the silver produced by development.

The invention relates to a light-sensitive photographic silver halide emulsion characterised by containing a copolymer having recurrent units of the following formula

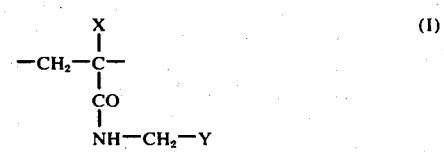

(I)

in which
X represents hydrogen or alkyl with 1 to 4 carbon atoms, preferably methyl, and
Y represents an 8-hydroxyquinoline group of the following formula attached at the 5- or 7-position:

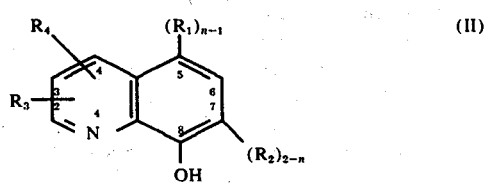

(II)

in which
- $R_1$, or $R_2$ (which ever is present) represents hydrogen, halogen such as fluorine, chlorine, bromine or iodine, or alkyl and 1 to 4 carbon atoms;
- $R_3$ and $R_4$ which may be the same or different represent hydrogen or alkyl with 1 to 4 carbon atoms, preferably methyl, and
- n represents 1 when the 8-hydroxyquinoline group is attached at the 5-position or 2 when it is attached at the 7-position.

These copolymers have a controlling effect on the growth of the silver halide grain, for example they may be growth inhibitory. Their influence may vary according to the nature of the silver halide (chloride or bromide) and within certain limits it can be regulated as desired by suitable choice of the proportion of monomer containing 8-oxyquinoline groups in the comonomer mixture. The proportion in the comonomer mixture of the 8-oxyquinoline monomers which determine the properties of the copolymers and hence the proportion of recurrent structural units of the above formula in the copolymer may range from 0.1 to 20 mol%.

The comonomers used are mainly water-soluble compounds having at least one copolymerisable double bond, e.g. polymerisable compounds containing carboxylic acid, sulphonic acid or phosphonic acid groups, for example acrylic acid, methacrylic acid, vinyl sulphonic acid, styrene sulphonic acid, allyl sulphonic acid, methallyl sulphonic acid, acrylamido-2-methyl-propane sulphonic acid and salts of the aforesaid acids, vinyl pyridine, N-vinyl pyrrolidone, vinyl methyl esters, acrylamide and methacrylamide.

In some cases, it may be advantageous to incorporate also limited quantities, e.g. up to 20 mol %, of other, less water-soluble polymerisable monomers in order to achieve certain effects, for example to influence the elasticity and the swelling properties. Examples of such monomers include, for example, acrylonitrile, acrylic acid esters and N-substituted acrylamides and methacrylamides.

The molecular weight of the homopolymers and copolymers used according to the invention is generally within the range of from 10,000 to 500,000. If the molecular weight is too low, the viscosity of the emulsion during preparation of the product is too low and the protective colloid action is generally unsatisfactory. On the other hand, a molecular weight which is too high is liable to reduce the compatibility with other binders, for example with gelatine.

The invention also relates to a process for the preparation of a photographic silver halide emulsion by precipitation and physical ripening of the silver halide in the presence of a peptisation agent followed by flocculation of the emulsion, washing of the flocculated emulsion if indicated, and its redispersion and chemical ripening, characterised in that precipitation of the silver halide is carried out in the presence of a copolymer containing up to 20 mol % of recurrent structural units of the formula given above.

Copolymers which have proved to be particularly suitable are those which, in addition to containing structural units of the formula indicated above, also contain structural units obtained by copolymerisation with acrylamide, acrylic acid and a vinyl monomer of the following general formula

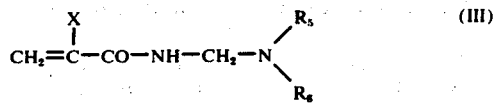

in which
- X has the same meaning specified for formula I and
- $R_5$ and $R_6$ represent alkyl groups with 1 to 4 carbon atoms, and/or N-vinylpyrrolidone.

Preparation of the monomers and of the copolymers has been described in German Offenlegungsschrift No. 1,595,465. The monomers contain a polymerisable double bond and may be homopolymerised or copolymerised by the usual polymerisation methods for example solvent-free polymerisation or polymerisation in solution or emulsion, but for the preparation of photographic binders the methods of solution or emulsion polymerisation are the most suitable. The temperature at which the polymers according to the present invention are prepared may vary within a wide range since it depends on various factors such as the specific monomer used, the reaction time and the initiator system employed. The polymerisation temperature is generally not higher than 110° C and is in most cases between 50° C and 100° C. Polymerisation may be carried out in the usual solvents such as alcohols, e.g. methanol, ethanol, isopropanol or butanol or in dimethylformamide or also in water or in mixtures of water and one of the other solvents mentioned above. The total concentration of the polymerisable monomers in the polymerisation mixture may vary considerably, and satisfactory results are obtained using concentrations of from 10 to 40% by weight, based on the total quantity of polymerisation mixture. Examples of suitable catalysts include compounds which give rise to free radicals, e.g. per compounds such as persulphate, porofors, that is to say azo compounds which are decomposed by heat such as azodiisobutyronitrile (=Porofor N) or redox polymerisation systems. Reference may be had in this connection to Houben-Weyl, Methoden der Organischen Chemie, 4th Edition, 1961, Volume XIV/1, pages 209 et seq. The addition of a molecular weight regulator may also be indicated in some cases, for example an increase in the quantity of isopropanol added reduces the molecular weight obtained. The polymers can be isolated from the reaction mixture in known manner by freezing, salting out, precipitation or any other suitable method.

Some examples of the preparation of polymers used according to the invention are given below.

POLYMER 1

A solution of
- 4.8 g of 50% benzoyl peroxide in 90 g of benzene
is added dropwise over a period of 3 hours t a solution of 120 g of acrylamide,
- 8.0 g of N-vinylpyrrolidone and
- 2.5 g of 5-N-methacryloylamidomethyl-8-hydroxyquinoline in 430 g of absolute ethanol while the reaction mixture is stirred and nitrogen is passed over it.

The temperature of the reaction mixture is kept at 75° C to during the polymerisation reaction.

The reaction is left to continue for 3 hours at 70° to 80° C after addition of the initiator and the mixture is then suction filtered. After drying in a vacuum at 80° C, 130 g of a white, pulverulent polymer is obtained. It is distinguished by its high solubility in water, 100 g of polymer dissolving in 100 ml of water.

POLYMER 2

A terpolymer with a high 8-hydroxyquinoline content is prepared similarly.
101.4 g of acrylamide,
6.6 g of N-vinylpyrrolidone and
8.4 g of 5-N-methacryloylamidomethyl-8-hydroxyquinoline are dissolved in
360 g of ethanol and heated to 75° C under an atmosphere of nitrogen.
A solution of
4 g of 50% benzoyl peroxide in
80 g of ethanol
is then added in small portions over a period of 2 hours. The mixture is left to react for a further 3 hours at 75° C and the precipitated polymer is then removed by suction filtration. The yield after drying in a vacuum at 80° C was 115 g.

The phenolic hydroxyl group content in the polymer was determined by titration and compared with the theoretically calculated quantity:
Phenol OH found: 0.50 calculated: 0.51.

This indicates that the amidoalkylated functional 8-hydroxyquinoline has been completely incorporated by polymerisation.

POLYMER 3

120 g of N-dimethylaminomethyl-methacrylamide

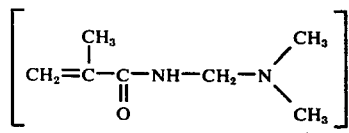

and 3 g of 5-N-methacryloylamidomethyl-8-hydroxyquinoline are dissolved in 680 g of benzene. A solution of 0.8 g of azadiisobutyronitrile in 10 g of benzene is then added dropwise at 75° C under a nitrogen atmosphere over a period of 4 hours. After a further 8 hours, the precipitated polymer is isolated by suction filtration and dried in a vacuum at 80° C. The yield was 120 g.

POLYMER 4

A terpolymer is prepared from
120 g of acrylamide,
8.0 g of N-vinylpyrrolidone and
2.5 g of 7-N-methacryloylamidomethyl-8-hydroxyquinoline by a similar method to that used for the preparation of polymer 1. The polymer obtained in this case is also distinguished by its high solubility in water. 85 g of polymer dissolve in 100 g of water.

POLYMER 5

A terpolymer is prepared by a similar method to that used for the preparation of polymer 1 from
138 g of acrylamide
9.2 g of N-vinylpyrrolidone and 3.0 g of 5-N-methacryloylamidomethyl-8-hydroxyquinoline, using a solution of
0.375 g of azadiisobutyronitrile in
100 g of ethanol as initiator solution.

POLYMER 6

A terpolymer is prepared from
30 g of N-vinylpyrrolidone,
117 g of acrylamide and
3 g of 5-N-methacryloylamidomethyl-8-hydroxyquinoline by a similar method to that used for the preparation of polymer 5.

POLYMER 7

138 g of acrylamide,
9.2 g of N-vinylpyrrolidone and
3.0 g of 5-N-methacryloylamidomethyl-8-hydroxyquinoline are dissolved in 700 g of ethanol at 75° C under nitrogen. The following solutions are then added simultaneously and dropwise over a period of 3 hours at 75° C:
a. 0.375 g of azadiisobutyronitrile in 100 g of ethanol and
b. 1 g of n-dodecylmercaptan in 10 ml of ethanol.

The mixture is left to react for a further 3 hours at the same temperature and the precipitated polymer is then isolated by suction filtration. The yield was 149 g.

The polymers used according to the invention are added to the photographic silver halide emulsion before it is chemically ripened, preferably already while it is being precipitated. The quantity to be added depends on the desired effect and can easily be determined by a few simple tests in the usual manner. The binder used as protective colloid for precipitation of the silver halide may be composed, for example, of from 10 to 100% by weight of the polymer according to the invention and the remainder gelatine. The polymer according to the invention is generally used in quantities of from 500 mg to 500 g and preferably 1 g to 200 g per mol of silver halide to be precipitated. The substances used according to the invention are added in the form of aqueous solutions. The concentration of the substances in the aqueous solution is not critical and may vary within wide limits. The polymers must be sufficiently water-soluble to make it possible for an aqueous solution of the required concentration to be prepared. It is sufficient, for example, to use an aqueous solution with a concentration of from 1 to 5% by weight, although more concentrated solutions may, of course, be used if the substances are readily soluble. The solutions are generally prepared at a pH of about 7 although the solution may be kept at a slightly acid pH, for example at pH values of between 5 and 7, and in the case of so-called ammoniacal emulsions the pH of the solution may even be between 5 and 9.

The polymers are synthetic products of consistent quality. They are surprisingly found to produce a considerably increase in sensitivity without a significant coarsening of the silver halide grain. Other advantages include the rapid onset of development of the silver halide emulsions and in some cases increased covering power of the developed silver.

The substances according to the invention may be used in any silver salt emulsions and are preferably used in silver halide emulsion. Suitable silver halides include silver chloride, silver bromide and mixtures thereof, which may have a small silver iodide content of up to 15 mol %. The silver halides may be dispersed in the usual hydrophilic binders such as carboxymethylcellulose, polyvinyl alcohol, polyvinylpyrrolidone, alginic acid and its salts, esters or amides and proteins, preferably gelatine.

The emulsions may also contain other chemical sensitizers, for example quaternary ammonium and phosphonium salts and ternary sulphonium salts, reducing agents such as divalent tin salts, polyamines such as diethylene triamine or sulphur compounds as described in U.S. Pat. Specification No. 1,574,944. The above mentioned emulsions may also contain salts of noble metals such as ruthenium, rhodium, palladium, iridium, platinum or gold as chemical sensitizers, as described in the article by R. Koslowsky, Z. Wiss. Phot. 46, 65–74 (1951). They may also contain polyalkylene oxides or polyalkylene oxide derivatives as development accelerators or chemical sensitizers. These additives provide an additional increase in sensitivity.

The emulsions may be spectrally sensitized, for example with the usual monomethine or polymethine dyes such as acid or basic cyanines, hemicyanines, streptocyanines, merocyanines, oxonoles, hemioxonoles, styryl dyes and others, including trinuclear or higher nuclear methine dyes, for example rhodacyanines or neocyanines. Sensitizers of this kind have already been described, for example, in the work by F. M. Hamer entitled "The Cyanine Dyes and Related Compounds," (1964), Interscience Publishers John Wiley and Sons.

The emulsions may contain the usual stabilisers such as homopolar or salt-type compounds of mercury having aromatic or heterocyclic rings (for example mercapto triazoles), simple mercury salts, sulphonium mercury double salts and other mercury compounds. Azaindenes are also suitable stabilizers, particularly tetra- or pentaazaindenes and especially those which are substituted with hydroxyl or amino groups. Compounds of this kind have been described in the article by Birr, in Z. Wiss. Phot. 47, 2–27 (1952). Other suitable stabilizers include, inter alia, heterocyclic mercapto compounds such as phenyl mercaptotetrazole, quaternary benzothiazole derivatives, benzotriazole and the like.

The emulsions may be hardened in the usual manner, for example with formaldehyde or halogenated aldehydes containing a carboxyl group, such as mucrobromic acid, diketones, methane sulphonic acid esters, dialdehydes and the like or polyfunctional triazine derivatives such as tris-acrylolylhexohydrotriazine or halogenated or alkoxy substituted hexahydrotriazine derivatives.

The substances according to the invention demonstrate their advantageous effect not only in black and white emulsions but also in the production of colour photographic images. Their compatibility with the usual colour couplers is satisfactory. They may also be used in direct positive emulsions, for example those with a layered grain structure described in French Pat. Specification No. 1,585,791. They are also suitable for emulsions used for the silver dye bleaching process of dye diffusion process.

The effect of the polymers is particularly advantageous in silver halide emulsions which are precipitated in the presence of silica sols. The preparation of such emulsions has been described in German Offenlegungsschrift No. 1,797,254 and in U.S. Pat. No. 3,637,391.

According to another, preferred embodiment of the invention, the polymers are used in combination with polymers containing disulphonimide groups. Compounds of this kind have been described in German Pat. Specification No. 1,089,548 and in U.S. Pat. No. 3,052,656. The disulphonimide polymers are added before chemical ripening and preferably at the stage of precipitation of the flocculate. The concentration of the disulphonimides may vary within wide limits. Quantities of from 1 to 10%, based on the total quantity of binder during precipitation, have generally been found to be sufficient.

EXAMPLE 1

Sample 1

The following solutions were prepared from the preparation of a silver iodobromide gelatine emulsion:

| Solution A) | 1000 ml of water |  |
|---|---|---|
|  | 10 g of gelatine |  |
|  | 30 g of KBr |  |
|  | 2 g of KI | Temperature 50° C |
| Solution B) | 1000 ml of water |  |
|  | 40 g of AgNO$_3$ | Temperature 45° C. |

Solution B was added at a uniform rate to solution A over a period of 5 minutes. The mixture of the two solutions was then digested for 30 minutes at 50° C and cooled to 20° C. 10 ml of a 10% aqueous polystyrene sulphonic acid solution were then added and the emulsion was flocculated by lowering the pH to 3.0 with sulphuric acid (25%). The flocculate was left to settle and the supernatent solution was poured off. For chemical ripening, the flocculate was dissolved in 2000 ml of a 10% aqueous gelatine solution (pH 7.5) at 40° C.

When the flocculate had been dissolved, the pH was adjusted to 6.5, a suitable quantity of sulphur compounds and gold salts was added for ripening and the emulsion was ripened to full sensitivity at 55° C. 10 ml of a 5% aqueous solution of saponin (wetting agent), 10 ml of an aqueous solution of formaldehyde (hardener) and 20 ml of a 1% methanolic solution of 4-hydroxy-6-methyl-1,3,3,3a,7-tetraazaindene(stabilizer) were then added per kg of emulsion and the mixture was cast on a cellulose acetate substrate. The emulsion was then assessed sensitometrically after exposure in a conventional sensitometer behind a step wedge and development (7 and 16 minutes at 20° C) in a developer of the following composition:

| Sodium sulphite sicc. | 70.0 g |
|---|---|
| Borax | 7.0 g |
| Hydroquinone | 3.5 g |
| p-Monomethylaminophenol sulphate | 3.5 g |
| Sodium citrate | 7.0 g |
| Potassium bromide | 0.4 g |
| made up to 1 liter with water. | |

SAMPLES 2 – 6

Preparation of the emulsions and their assessment was carried out in the same way as described above but 50% of the gelatine in solution A was replaced in each sample by an equal quantity by weight of one of the polymers 1, 2 and 5 – 7 described above.

Table 1 below shows that emulsions 2 – 6 (containing polymers 1, 2 and 5–7) have a higher sensitivity and lower fog than the comparison emulsion.

Table 1

| Sample | Substance | Development for 7 minutes | | | Development for 16 minutes | | |
|---|---|---|---|---|---|---|---|
|  |  | Sensitivity ° | γ | Fog | Sensitivity | γ | Fog |
| 1 | none | basic | 1.10 | 0.18 | basic | 1.25 | 0.27 |
| 2 | Polymer 1 | +1.5° | 1.15 | 0.18 | +2.0 | 1.30 | 0.29 |
| 3 | Polymer 2 | +1° | 1.00 | 0.12 | +1.5° | 1.10 | 0.17 |

Table 1-continued

| Sample | Substance | Development for 7 minutes | | | Development for 16 minutes | | |
|---|---|---|---|---|---|---|---|
| | | Sensitivity ° | γ | Fog | Sensitivity | γ | Fog |
| 4 | Polymer 5 | +2.5° | 1.05 | 0.09 | +3° | 1.20 | 0.12 |
| 5 | Polymer 6 | +3° | 1.20 | 0.16 | +3° | 1.25 | 0.21 |
| 6 | Polymer 7 | +2° | 1.05 | 0.13 | +2.5° | 1.15 | 0.19 |

3° = 1 shutter stop

EXAMPLE 2

Sample 1

The same silver iodobromide gelatine emulsion as described in Example 1 under the heading Sample 1 was prepared as blank.

SAMPLES 2 – 6

These emulsions were prepared in the same way as Sample 1 except that the whole quantity of gelatine in solution A was replaced in each sample by the same quantity by weight of one of the polymers 1, 2 and 5–7 described above. After precipitation of the silver halide, 10 g of gelatine were added as 10% aqueous solution, whereupon the emulsion was flocculated by the addition of polystyrene sulphonic acid and lowering of the pH to 3.0 with sulphuric acid. The subsequent treatment was the same as described in Example 1.

Table 2

| Sample | Substance | Development time 7 minutes | | | Development time 16 minutes | | |
|---|---|---|---|---|---|---|---|
| | | Sensitivity | γ | Fog | Sensitivity | γ | Fog |
| 1 | none | basic | 1.05 | 0.29 | basic | 1.20 | 0.40 |
| 2 | Polymer 1 | +3° | 1.05 | 0.28 | +3.5° | 1.05 | 0.41 |
| 3 | Polymer 2 | +1.5° | 1.30 | 0.24 | +2.5° | 1.45 | 0.32 |
| 4 | Polymer 5 | +5° | 1.10 | 0.20 | +5.5° | 1.25 | 0.23 |
| 5 | Polymer 6 | +4° | 1.15 | 0.27 | +4° | 1.20 | 0.39 |
| 6 | Polymer 7 | +3.5° | 1.05 | 0.25 | +4.0° | 1.15 | 0.35 |

3° = 1 shutter stop

Both Tables show the surprising effect of increased sensitivity, which is greatest when 100% of polymer is used without gelatine.

The range of application is not restricted to the examples given above but may be extended to any type of emulsion and all possible silver halide compositions with suitable modifications.

We claim:

1. A light sensitive photographic silver halide emulsion containing from 500 mg to 500 g per mol of silver halide of a copolymer comprising 0.1 to 20 mol% of recurring structural unit of the formula I:

$$-CH_2-\underset{\underset{NH-CH_2-Y}{\underset{|}{CO}}}{\overset{\overset{X}{|}}{C}}-$$

in which

X represents hydrogen, halogen or an alkyl group having 1 to 4 carbon atoms, and Y represents an 8-hydroxyquinoline group of the formula II attached to the remainder of formula I through its 5- or 7-position:

$$\text{(II)}$$

in which $R_1$ or $R_2$ represents hydrogen or an alkyl group having 1 to 4 carbon atoms, $R_3$ and $R_4$ which may be the same or different represent hydrogen or an alkyl group having 1 to 4 carbon atoms, and is 1 when the 8-hydroxyquinoline group is attached through its 5-position, and 2 when the 8-hydroxy quinoline group is attached through its 7-position and 80 to 99.9 mol % of recurring structural units derived from one or more ethylenically unsaturated copolymerisable comonomers consisting essentially of water soluble compounds.

2. An emulsion as claimed in claim 1 in which the comonomers are selected from the group consisting of acrylic acid, methacrylic acid vinylsulfonic acid, styrene sulfonic acid, allylsulfonic acid, methallyl sulfonic acid acrylamido-2-methylpropane sulfonic acid including salts of these acids, vinyl pyridine, N-vinyl pyrrolidone, vinyl methyl esters, acrylamide and methacrylamide.

3. An emulsion as claimed in claim 1 in which the copolymer contains from 80 to 99.9 mol% of copolymerised units of N-vinylpyrrolidone or 80 to 99.9 mol% of copolymerised units selected from N-vinylpyrrolidone, acrylamide, acrylic acid and a vinyl monomer of formula III:

$$CH_2=\overset{\overset{X}{|}}{C}-CO-NH-CH_2-N\overset{R_5}{\underset{R_6}{\diagup\!\!\!\diagdown}}$$

in which

X represents hydrogen or an alkyl group having 1 to 4 carbon atoms, and $R_5$ and $R_6$ represent alkyl having 1 to 4 carbon atoms.

4. In the process for the preparation of a photographic silver halide emulsion comprising the steps of precipitation and physical ripening of the silver halide in the presence of a peptisation agent, flocculation of the emulsion, washing of the emulsion if indicated redispersion and chemical ripening, in which the improvement comprises the precipitation of the silver halide is carried out in the presence of a copolymer comprising 0.1 to 20 mol% of recurrent structural structural units of the formula I:

$$CH_2-\underset{\underset{NH-CH_2-Y}{\underset{|}{CO}}}{\overset{\overset{X}{|}}{C}}-\quad\text{(I)}$$

in which

X represents hydrogen or an alkyl group having 1 to 4 carbon atoms

Y represents an 8-hydroxyquinoline group of the formula II attached to the remainder of formula I through its 5- or 7-position:

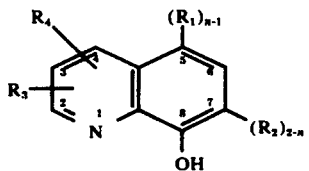

in which $R_1$, $R_2$ represent hydrogen, halogen or an alkyl group having 1 to 4 carbon atoms, $R_3$ and $R_4$ which may be the same or different represent hydrogen or an alkyl group having 1 to 4 carbon atoms and n represents 1 when the 8-hydroxyquinoline ring is attached through its 5-position, and 2 when the 8-hydroxyquinoline ring is attached through its 7-position.

5. The process as claimed in claim 4, in which 10 to 100% by weight of the peptisation agent consists of the copolymer.

* * * * *